(12) United States Patent
Chang

(10) Patent No.: US 7,701,651 B2
(45) Date of Patent: Apr. 20, 2010

(54) LENS MODULE STRUCTURE WITH A METAL SHELL AND ASSEMBLING METHOD THEREFOR

(75) Inventor: Feng Chang, Keelung (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 12/000,803

(22) Filed: Dec. 18, 2007

(65) Prior Publication Data

US 2009/0103192 A1 Apr. 23, 2009

(30) Foreign Application Priority Data

Oct. 17, 2007 (TW) .............................. 96138862 A

(51) Int. Cl.
*G02B 7/02* (2006.01)
*G02B 15/14* (2006.01)

(52) U.S. Cl. ......................... 359/811; 359/694; 359/704

(58) Field of Classification Search ................. 359/694, 359/699, 702–704, 808, 811, 813–814, 818–819, 359/822–824

See application file for complete search history.

(56) References Cited

U.S. PATENT DOCUMENTS

2005/0237637 A1 * 10/2005 Lung .......................... 359/819
2007/0097518 A1 * 5/2007 Sanou et al. ................ 359/694

* cited by examiner

*Primary Examiner*—Scott J Sugarman
*Assistant Examiner*—Dawayne A Pinkney
(74) *Attorney, Agent, or Firm*—Rosenberg, Klein & Lee

(57) ABSTRACT

A lens module structure with a metal shell includes a metal shell and a lens module. The metal shell has a bottom casing and a top casing. The bottom casing has several lateral plates which have protrusions inwardly. At least two lateral plates have first locking portions. Second locking portions corresponding to the first locking portions are disposed on the side wall of the top casing. The lens module has metal portions and is assembled with the bottom casing. Each of the protrusions on the bottom casing abuts and holds the metal portions. Furthermore, the top casing is assembled with the bottom casing via locking the second locking portions with the first locking portions. The protrusions have a predetermined length. The protrusions can abut and hold the lens module with a predetermined size. Moreover, the effect of anti-electromagnetic interference is improved.

10 Claims, 3 Drawing Sheets

LENS MODULE STRUCTURE WITH A METAL SHELL AND ASSEMBLING METHOD THEREFOR

BACKGROUND OF THE INVENTION

1. Field of the Invention

The present invention is related to a lens module structure with a metal shell and assembling method therefor, and more particular to an improved lens module structure with a metal shell and assembling method therefor that can save the cost for molding and can prevent electromagnetic interference.

2. Description of Related Art

Conventional lens modules are used in electrical devices like digital cameras, mobile phones or PDA (Personal Digital Assistant) which are modular products capable of taking pictures. In order to prevent electromagnetic interference (EMI), the lens modules are generally covered with a metal shell.

At present, the metal shell is usually realised by assembling a top casing with a bottom casing. The lens module is disposed in the bottom casing first and then covered with the top casing. There are bumps of the bottom casing which lock the top casing giving the shell a solid structure. The shell effectively prevents EMI of the lens module with surrounding electronic devices.

The metal shell has a predetermined size corresponding to the lens module. When the size of the lens module is variable (for example: 8 mm, 10 mm or 12 mm), different sizes of the metal shell must be provided to accommodate the lens module. Manufacturers need to manufacture several sets of metal molds (including top casing and bottom casing), and further stamp several sets of metal shells for the different size of lens module. Hence, the cost are high.

Therefore, in view of this, the inventor proposes the present invention to overcome the above problems based on his expert experience and deliberate research.

SUMMARY OF THE INVENTION

The object of the present invention is to provide an improved lens module structure with a metal shell and assembling method therefor that has the effects of saving the molding cost, reducing the manufacturers cost and preventing EMI.

For achieving the object described above, the present invention provides a lens module structure with a metal shell, which includes a metal shell having a bottom casing and a top casing. The bottom casing comprises a bottom plate and three lateral plates extending upwardly from the edges of the bottom plate. Each of the lateral plates protrudes a protrusion inwardly. At least two lateral plates have first locking portions. The top casing comprises a top wall and four lateral walls extending downward from the edges of the top wall. Two of the four lateral walls have second locking portions corresponding to the first locking portions. A lens module is assembled with the bottom casing. The lens module has metal portions. Each of the protrusions abuts and holds the metal portions. Each of the first locking portions locks each of the second locking portions. Thus the top casing is assembled with the bottom casing.

For achieving the object described above, the present invention also provides a method for assembling a lens module structure with a metal shell. The method is as follows: A first metal plate and a second metal plate are provided. The first metal plate is stamped to form a bottom casing. The bottom casing comprises a bottom plate and three lateral plates extending upwardly from the edges of the bottom plate. Each of the lateral plates protrudes a protrusion inwardly. At least two lateral plates have first locking portions. The second metal plate is stamped to form a top casing. The top casing comprises a top wall and four lateral walls extending down from the edges of the top wall. Two of the four lateral walls have second locking portions corresponding to the first locking portions. Each of the first locking portions of the bottom casing locks the second locking portion of the top casing.

The present invention has advantageous effects as follows. The casing is made by metal stamping instead of molding. The inward protrusions of a predetermined length are formed via stamping the lateral plates of the bottom casing. The protrusions can abut and hold the lens module with a predetermined size. When the top casing and the bottom casing are assembled with the lens module of a different size, the stamping length of the protrusions is adjusted to stamp the first metal plate with a appropriate protruded length. Thus, the same casing can be used for different lens modules. The cost for molding are avoided. The materials of the present invention are easy to prepare. The first metal plate and the second plate can be provided in one size. The present invention has the effect of reducing cost.

Secondly, each of the protrusions of the bottom casing can abut and hold the metal portions to prevent from electromagnetic interference.

In order to further understand the characteristics and technical contents of the present invention, a detailed description is made with reference to the accompanying drawings. However, it should be understood that the drawings are illustrative only but not used to limit the present invention thereto.

DETAILED DESCRIPTION OF THE PREFERRED EMBODIMENTS

Figure 1:
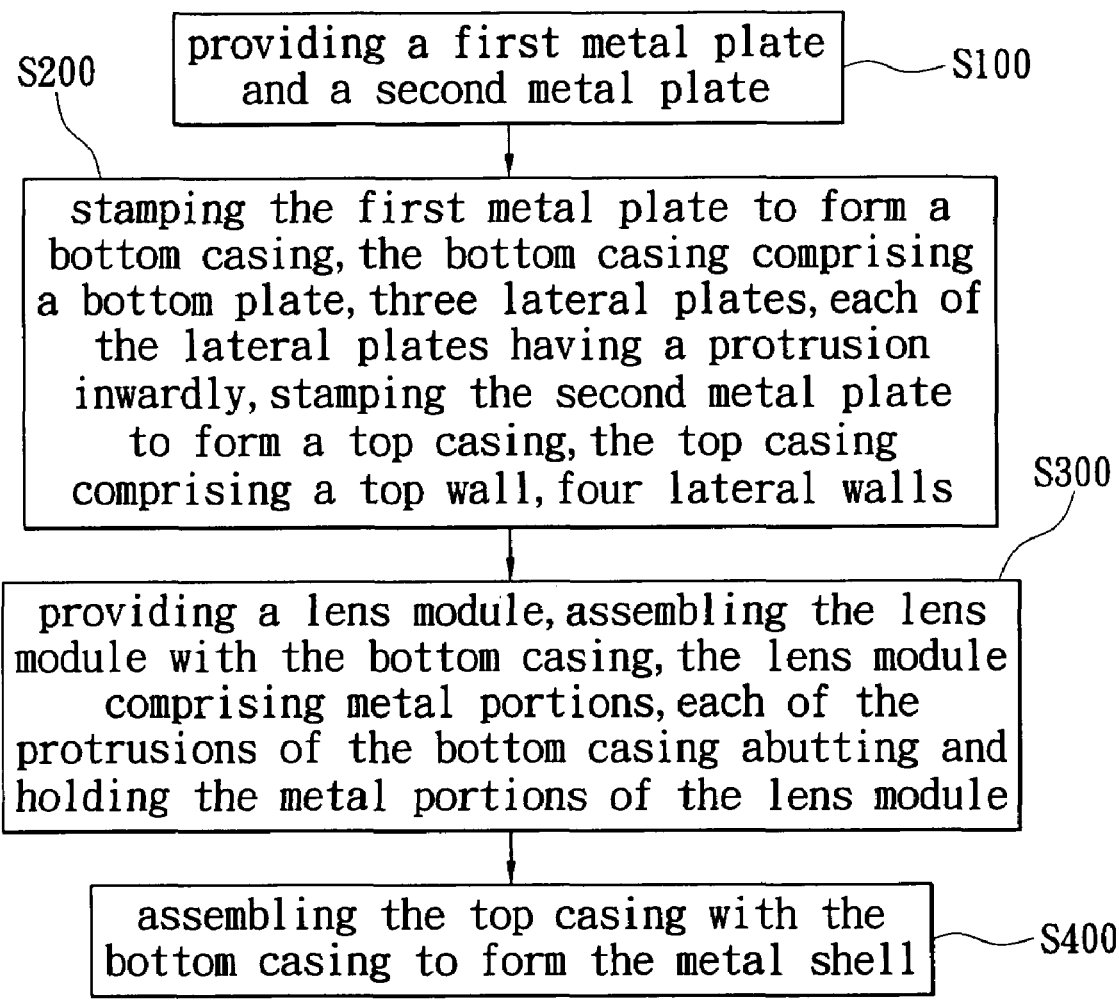
FIG. 1 is a flowchart showing the assembling method of the present invention.
Figure 2:
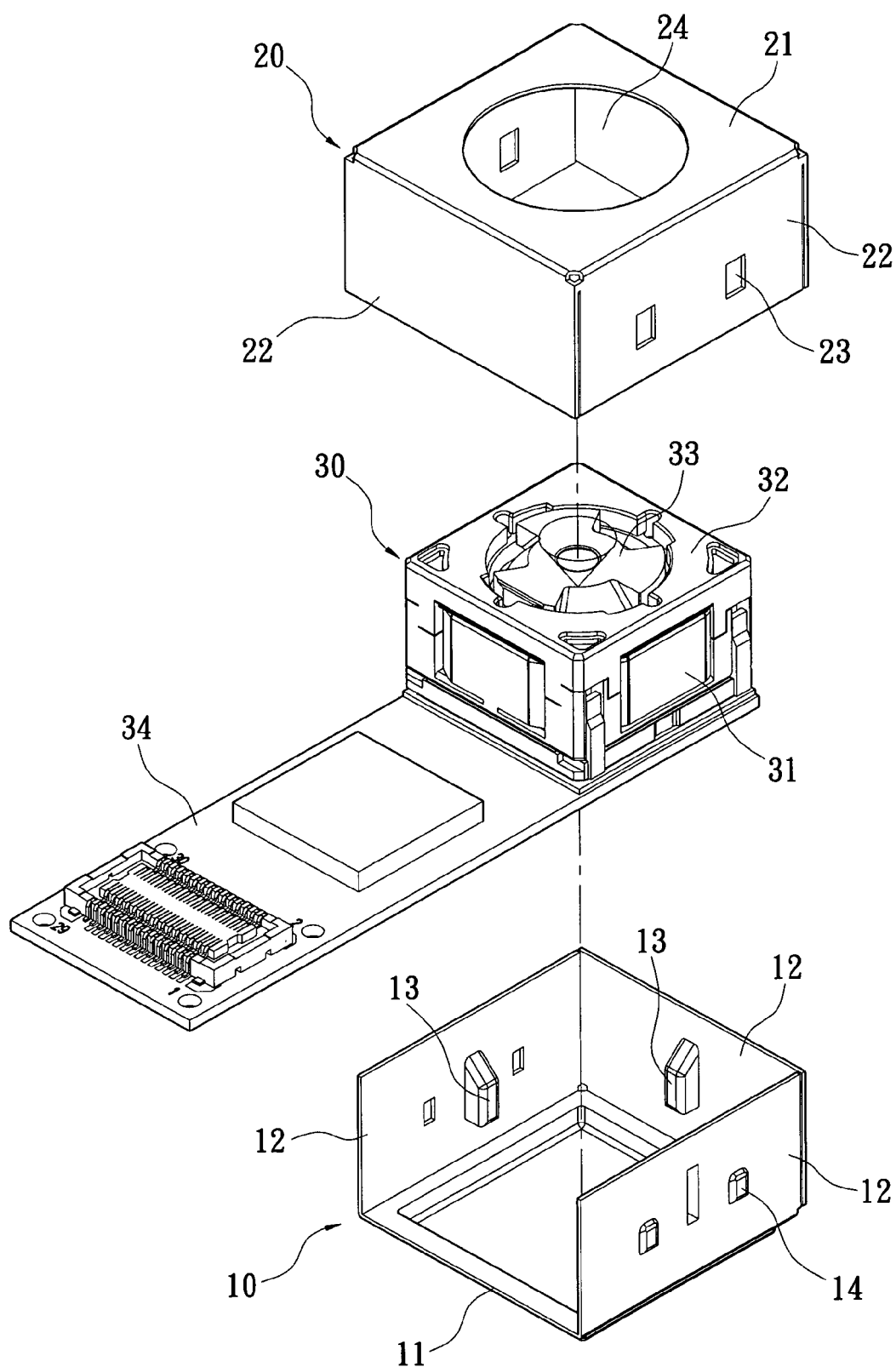
FIG. 2 is an exploded view showing the top casing, the lens module and the bottom casing of the present invention.
Figure 3:
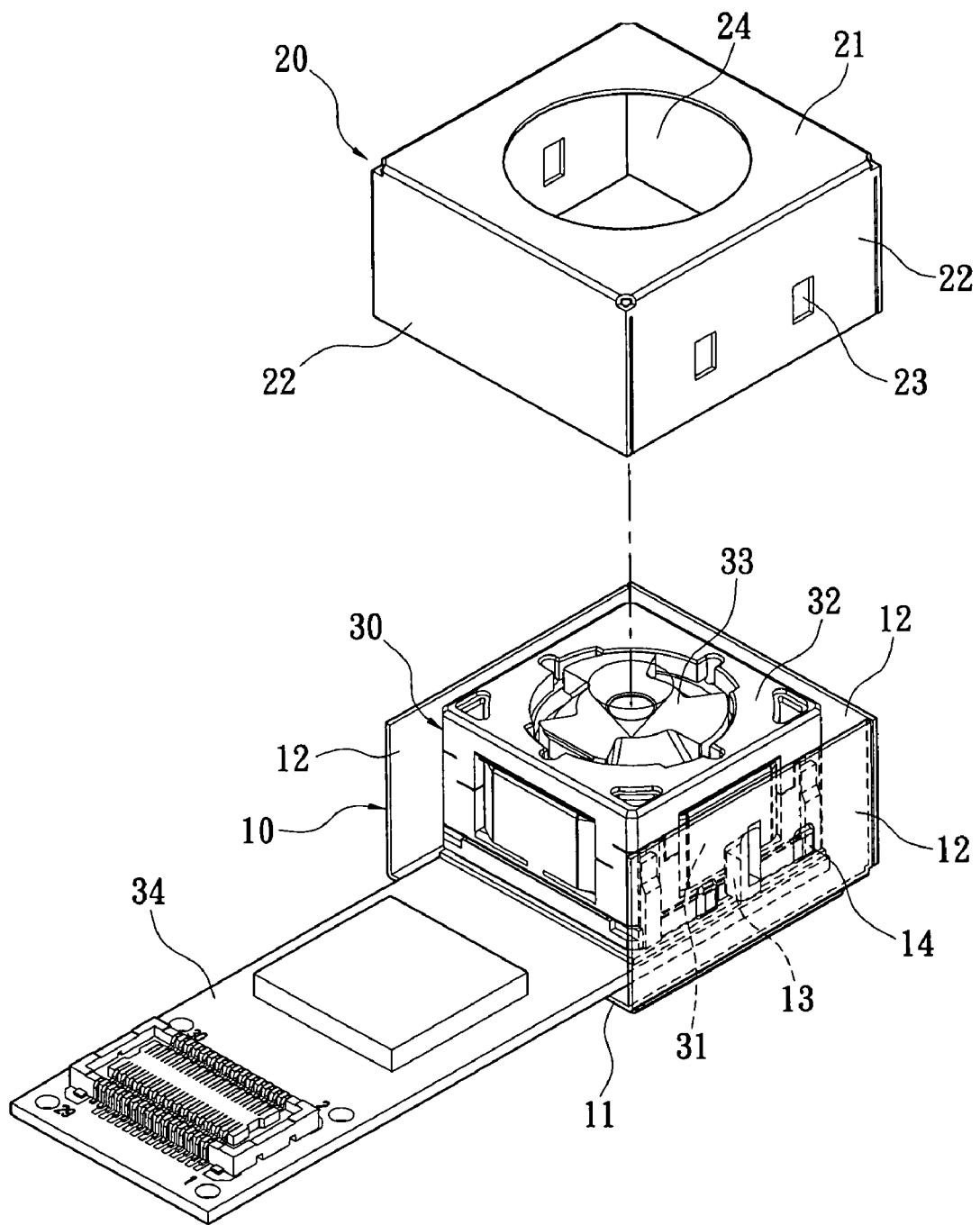
FIG. 3 is a perspective view showing the top casing assembled with the lens module and the bottom casing of the present invention.

Please refer to FIGS. 1 to 3. The present invention is to provide a lens module structure with a metal shell and assembling method therefore. The assembling method is as follows:

(S100) A first metal plate and a second metal plate are provided.

(S200) The first metal plate is stamped to form a bottom casing 10. The second metal plate is stamped to form a top casing 20. (as FIG. 2)

The bottom casing 10 includes a bottom plate 11, and three lateral plates 12 extending upwardly from the edges of the bottom plate 11. Each of the lateral plates 12 protrudes a predetermined length protrusion 13 inwardly. At least two lateral plates 12 have first locking portions 14.

The top casing 20 includes a top wall 21 and four lateral walls 22 extending down from the edges of the top wall 21. Two of the four lateral walls 22 have second locking portions 23 corresponding to the first locking portions 14 of the bottom casing 10. The top wall 21 has an opening 24 for detecting an image.

In the Figures of the present invention, the first locking portion 14 is a bump. The second locking portion 23 is a hole. Contrarily, the first locking portion 14 can be a hole. The second locking portion 23 can be a bump.

(S300) A lens module 30 with a predetermined size is provided. The lens module 30 is assembled with the bottom casing 10 first. The lens module 30 has metal portions 31. Each of the protrusions 13 of the bottom casing 10 can abut and hold the metal portions 31 of the lens module 30. Thus the lens module 30 is fixed. It has the effect of preventing EMI.

Furthermore, the lens module 30 includes a housing 32, a lens 33 disposed in the housing 32, a motor (not shown in Figures) that can drive the lens 33 to move axially, a circuit board 34 installed under the housing 32 and electrical connected with the motor. The metal portions 31 can consist of the shell of the motor, but the invention is not limited thereto. The lens module 30 is also not limited to a specific type.

(S400) The top casing 20 is assembled with the bottom casing 10. The top casing 20 covers the bottom casing 10. Each of the first locking portions 14 locks each of the second locking portions 23.

The lens module structure of the present invention is obvious according to the above-mentioned assembling method. The bottom casing 10 assembled with the top casing 20 is the metal shell of the present invention. The metal shell is for covering the lens module 30.

Hereby, the protrusions 13 protruded a predetermined length inwardly are formed via stamping the lateral plates 12 of the bottom casing 10. The protrusions 13 can abut and hold the lens module 30 with a predetermined size. When the bottom casing 10 and the top casing 20 are assembled with another lens module 30 of a different size (For example, replace 12 mm with 10 mm or 8 mm), the stamping length of the protrusions 13 is adjusted to stamp the first metal plate with a appropriate protruded length. Thus, the same casing base can be used for the different lens module 30. The cost of molding are avoided. The materials of the present invention are easy to prepare. The first metal plate and the second plate can be provided in one size. The present invention has the effect of reducing cost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for assembling a lens module with a metal shell, including:
   providing a lens module with a predetermined size; the lens module having metal portions disposed on a central area of the outer surface thereof;
   providing a first metal plate and a second metal plate;
   punching the first metal plate to form a bottom casing with a fixed size, the bottom casing comprising a bottom plate, three lateral plates extending upwardly from the edges of the bottom plate, at least two lateral plates having a plurality of first locking portions;
   inwardly punching each of the lateral plates of the bottom casing to form a protrusion in a predetermined length protruded from a central area of the inner surface thereof;
   wherein the predetermined length of the protrusion is adjusted according to the size of the lens module;
   punching the second metal plate to form a top casing, the top casing comprising a top wall, four lateral walls extending down from the edges of the top wall, two of the four lateral walls having a plurality of second locking portions corresponding to the first locking portions; wherein said plurality of first locking portions and said plurality of second locking portions are physically separated and distinct from said protrusion;
   assembling the lens module with the bottom casing, each of the protrusions of the bottom casing abutting against the metal portions of the lens module for holding the lens module; and
   assembling the top casing with the bottom casing to form the metal shell, each of the first locking portions of the bottom casing locking each of the second locking portions of the top casing, whereby one of the lens modules with different sizes can be assembled to the top casing and the bottom casing with the fixed size due to the protrusions with the adjustable punching length.

2. The method for assembling a lens module with a metal shell according to claim 1, wherein each of the first locking portions is a bump, and each of the second locking portions is a hole.

3. The method for assembling a lens module with a metal shell according to claim 1, wherein the top casing covers the bottom casing.

4. A lens module structure with a metal shell, including:
   a metal shell having a bottom casing and a top casing, the bottom casing comprising a bottom plate with a fixed size, three lateral plates extending upwardly from the edges of the bottom plate, each of the lateral plates of the bottom casing having a protrusion with an adjustable punching length protruded inwardly from a central area of the inner surface thereof; at least two of the lateral plates having a plurality of first locking portions, the top casing comprising a top wall, four lateral walls extending down from the edges of the top wall, two of the four lateral walls having a plurality of second locking portions corresponding to the first locking portions of the bottom casing; wherein said plurality of first locking portions and said plurality of second locking portions are physically separated and distinct from said protrusion; and
   a lens module assembled with bottom casing, the lens module having metal portions disposed on a central area of the outer surface thereof, each of the protrusions of the bottom casing abutting against the metal portions of the lens module for holding the lens module, the top casing assembled with the bottom casing, each of the plurality of first locking portions of the bottom casing locking each of the plurality of second locking portions of the top casing, whereby one of the lens modules with different sizes can be assembled to the top casing and the bottom casing with the fixed size due to the protrusions with the adjustable punching length.

5. The lens module structure with a metal shell according to claim 4, wherein each of the first locking portions of the top casing is a bump, and each of the second locking portions of the bottom casing is a hole.

6. The lens module structure with a metal shell according to claim 4, wherein the top casing covers the bottom casing.

7. A metal shell for covering a lens module, including:
   a bottom casing with a fixed size, comprising a bottom plate, three lateral plates extending upwardly from the edges of the bottom plate, each of the lateral plates of the bottom casing having a protrusion with an adjustable punching length protruded inwardly from a central area of the inner surface thereof, at least two of the lateral plates having a plurality of first locking portions; and a top casing assembled with the bottom casing, comprising a top wall, four lateral walls extending down from the edges of the top wall, two of the four lateral walls having a plurality of second locking portions corresponding to the plurality of first locking portions of the bottom casing, each of the plurality of first locking portions of the bottom casing locking each of the plurality of second locking portions of the top casing, whereby one of the lens modules with different sizes can be assembled to the top casing and the bottom casing with the fixed size due to the protrusion with the adjustable punching length; wherein said plurality of first locking portions and said plurality of second locking portions are physically separated and distinct from said protrusion.

8. The metal shell according to claim 7, wherein each of the first locking portions of the top casing is a bump, and each of the second locking portions of the bottom casing is a hole.

9. The metal shell according to claim 7, wherein each of the first locking portions of the top casing is a hole, and each of the second locking portions of the bottom casing is a bump.

10. The metal shell according to claim 7, wherein the top casing covers the bottom casing.

* * * * *